US012538090B2

(12) United States Patent
Ikeda

(10) Patent No.: US 12,538,090 B2

(45) Date of Patent: Jan. 27, 2026

(54) AUDIO CONTROL SYSTEM, AUDIO CONTROL METHOD, AND RECORDING MEDIUM

(71) Applicant: Panasonic Intellectual Property Management Co., Ltd., Osaka (JP)

(72) Inventor: Junichi Ikeda, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 228 days.

(21) Appl. No.: 18/382,707

(22) Filed: Oct. 23, 2023

(65) Prior Publication Data

US 2024/0056759 A1 Feb. 15, 2024

Related U.S. Application Data

(63) Continuation of application No. PCT/JP2021/047363, filed on Dec. 21, 2021.

(30) Foreign Application Priority Data

Apr. 26, 2021 (JP) ................................ 2021-074459

(51) Int. Cl.
*H04S 7/00* (2006.01)
*H04R 1/04* (2006.01)

(52) U.S. Cl.
CPC ............... *H04S 7/303* (2013.01); *H04R 1/04* (2013.01); *H04R 2430/01* (2013.01); *H04S 2400/13* (2013.01); *H04S 2400/15* (2013.01)

(58) Field of Classification Search
CPC ........ H03G 3/32; H03G 3/24; H04R 2430/01; H04R 1/1083; H04R 2227/001;
(Continued)

(56) References Cited

U.S. PATENT DOCUMENTS 10,157,604 B1 12/2018 Carter
10,418,019 B1 * 9/2019 Murad .............. G10K 11/1754
(Continued)

FOREIGN PATENT DOCUMENTS

GB 2562507 A * 11/2018 ......... G10K 11/1754
JP 2008-233670 10/2008
(Continued)

OTHER PUBLICATIONS

Partial Supplementary European Search Report issued Aug. 22, 2024 in corresponding European Patent Application No. 21939391.5.

(Continued)

*Primary Examiner* — Kile O Blair
(74) *Attorney, Agent, or Firm* — Wenderoth, Lind & Ponack, L.L.P.

(57) ABSTRACT

An audio control system includes: an obtainer that obtains sound data indicating a sound picked up by a microphone disposed in a second space located in an area surrounding a first space used by a person; a storage in which sound source data is stored; and a controller that causes a loudspeaker disposed in the first space or the second space to reproduce an audio obtained from the sound source data more loudly in the second space than in the first space. The controller determines a loudness the sound indicated in the sound data obtained, and adjusts a sound volume of the audio outputted from the loudspeaker to be lower with an increase in the loudness of the sound determined.

14 Claims, 11 Drawing Sheets

(58) Field of Classification Search
CPC .. G06F 3/165; G10K 11/175; G10K 11/1752; G10K 11/1754
See application file for complete search history.

(56) References Cited

U.S. PATENT DOCUMENTS

| | | | |
|---|---|---|---|
| 2011/0188666 | A1 | 8/2011 | Mason et al. |
| 2012/0316869 | A1 | 12/2012 | Xiang et al. |
| 2016/0196818 | A1 | 7/2016 | Christoph |
| 2017/0227941 | A1 | 8/2017 | Chosokabe et al. |

FOREIGN PATENT DOCUMENTS

| | | |
|---|---|---|
| JP | 2011-528445 | 11/2011 |
| JP | 2017-143444 | 8/2017 |
| WO | 2010/007563 | 1/2010 |

OTHER PUBLICATIONS

International Search Report (ISR) issued on Feb. 22, 2022 in International (PCT) Application No. PCT/JP2021/047363.

* cited by examiner

400

| Space identification information | Time period information | User information | |
|---|---|---|---|
| First space | 2021/06/20 10:00 to 12:00 | ID043 ID085 ID101 ID211 | 401 |
| Second space | 2021/06/20 10:00 to 11:30 | ID021 ID053 ID140 | 402 |

AUDIO CONTROL SYSTEM, AUDIO CONTROL METHOD, AND RECORDING MEDIUM

CROSS REFERENCE TO RELATED APPLICATIONS

This is a continuation application of PCT International Application No. PCT/JP2021/047363 filed on Dec. 21, 2021, designating the United States of America, which is based on and claims priority of Japanese Patent Application No. 2021-074459 filed on Apr. 26, 2021. The entire disclosures of the above-identified applications, including the specifications, drawings and claims are incorporated herein by reference in their entirety.

FIELD

The present disclosure relates to an audio control system, an audio control method, and a recording medium.

BACKGROUND

Patent Literature (PTL) 1 discloses a method of preventing a private conversation in a public space from being overheard. More specifically, adapting a degree of masking of sound so as to suit a social context of people in a public space is disclosed.

CITATION LIST

Patent Literature

PTL 1: Japanese Unexamined Patent Application Publication No. 2011-528445

SUMMARY

Technical Problem

The present disclosure provides an audio control system and the like capable of efficiently masking sound generated in a space used by people.

Solution to Problem

An audio control system according to one aspect of the present disclosure comprising: an obtainer that obtains sound data indicating a sound picked up by a microphone disposed in a second space located in an area surrounding a first space used by a person; a storage in which sound source data is stored; and a controller that causes one or more loudspeakers disposed in the first space or the second space to reproduce an audio obtained from the sound source data more loudly in the second space than in the first space, wherein the controller determines a loudness of the sound indicated in the sound data obtained, and adjusts a sound volume of the audio outputted from the one or more loudspeakers to be lower with an increase in the loudness of the sound determined.

An audio control system according to another aspect of the present disclosure comprising: an obtainer that obtains headcount information about a total number of people present in a second space located in an area surrounding a first space used by a person; a storage in which sound source data is stored; and a controller that causes one or more loudspeakers disposed in the first space or the second space to reproduce an audio obtained from the sound source data more loudly in the second space than in the first space, wherein the controller adjusts a sound volume of the audio outputted from the one or more loudspeakers to be lower with an increase in the total number of people based on the headcount information obtained.

An audio control method according to one aspect of the present disclosure comprising: obtaining sound data indicating a sound picked up by a microphone disposed in a second space located in an area surrounding a first space used by a person; and causing one or more loudspeakers disposed in the first space or the second space to reproduce an audio obtained from the sound source data more loudly in the second space than in the first space, wherein a loudness of the sound indicated in the sound data obtained is determined, and a sound volume of the audio outputted from the one or more loudspeakers is adjusted to be lower with an increase in the loudness of the sound determined.

An audio control method according to one aspect of the present disclosure comprising: obtaining headcount information about a total number of people present in a second space located in an area surrounding a first space used by a person; causing one or more loudspeakers disposed in the first space or the second space to reproduce an audio obtained from the sound source data more loudly in the second space than in the first space, wherein a sound volume of the audio outputted from the one or more loudspeakers is adjusted to be lower with an increase in the total number of people based on the headcount information obtained.

It should be noted that these general or specific aspects may be realized as a device, an integrated circuit, a computer program, or a computer-readable non-transitory recording medium such as a CD-ROM, or may be realized as any combination thereof.

Advantageous Effects

The audio control system and the like according to the present disclosure are capable of efficiently masking sound generated in a space used by people.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENT

Figure 1:
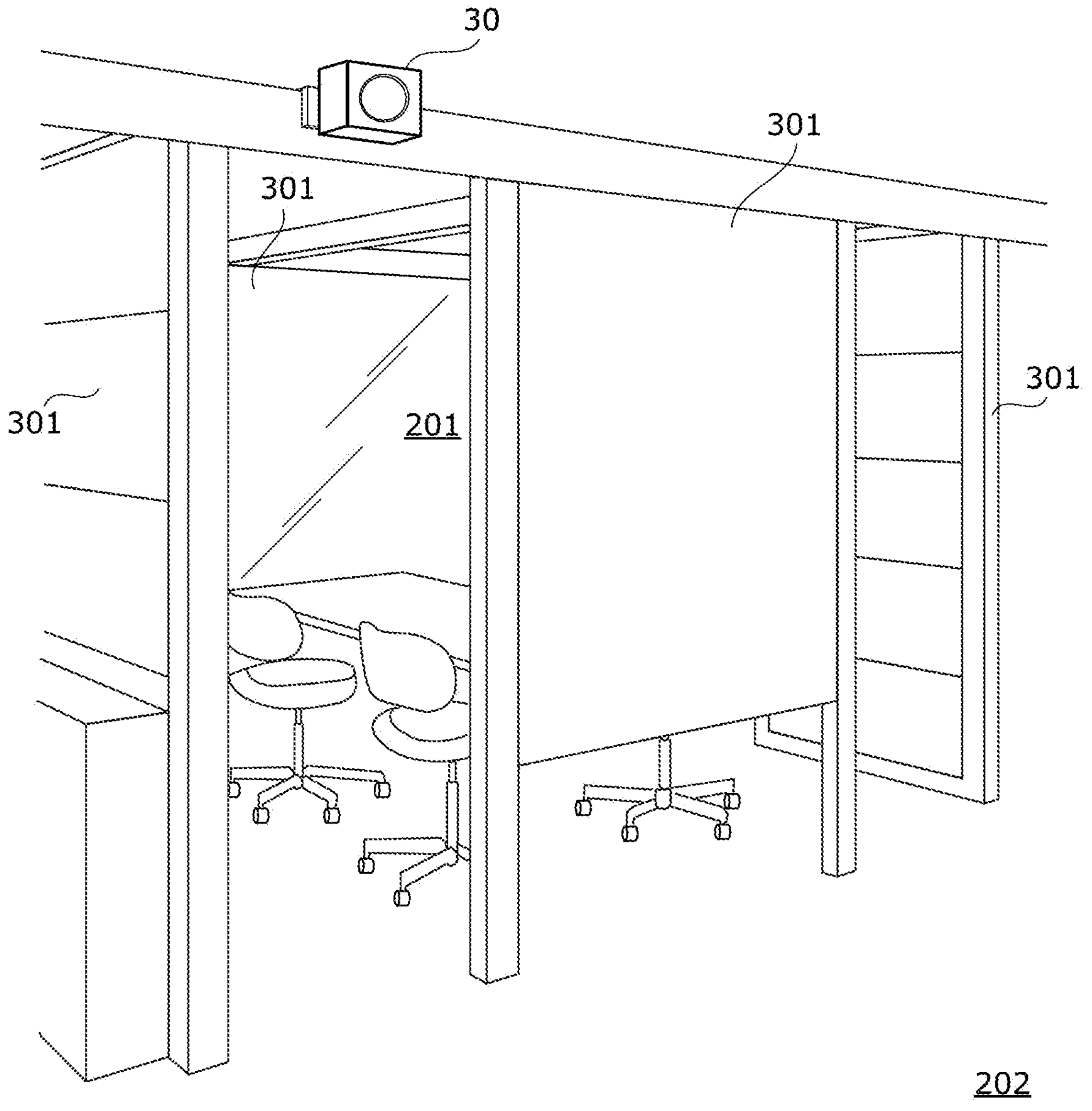
FIG. 1 is a diagram for describing a space to which an audio control system according to an embodiment is applied.

An audio control system according to one aspect of the present disclosure includes: an obtainer that obtains sound data indicating a sound picked up by a microphone disposed in a second space located in an area surrounding a first space used by a person; a storage in which sound source data is stored; and a controller that causes one or more loudspeakers disposed in the first space or the second space to reproduce an audio obtained from the sound source data more loudly in the second space than in the first space. The controller determines a loudness of the sound indicated in the sound data obtained, and adjusts a sound volume of the audio outputted from the one or more loudspeakers to be lower with an increase in the loudness of the sound determined.

Accordingly, since a sound volume of the audio for masking the sound generated in the first space is adjusted to be lower with an increase in the loudness of the sound picked up by the microphone in the second space, the sound generated in the first space can be masked in an efficient manner. Therefore, since power consumption required by masking can be reduced with an increase in the loudness of the sound in the second space, power consumption required to mask the sound generated in the first space can be reduced.

An audio control system according to another aspect of the present disclosure includes: an obtainer that obtains headcount information about a total number of people present in a second space located in an area surrounding a first space used by a person; a storage in which sound source data is stored; and a controller that causes one or more loudspeakers disposed in the first space or the second space to reproduce an audio obtained from the sound source data more loudly in the second space than in the first space. The controller adjusts a sound volume of the audio outputted from the one or more loudspeakers to be lower with an increase in the total number of people based on the headcount information obtained.

Accordingly, since a sound volume of the audio for masking the sound generated in the first space is adjusted to be lower with an increase in the total number of people present in the second space, the sound generated in the first space can be masked in an efficient manner. Therefore, since power consumption required by masking can be reduced with an increase in the total number of people in the second space, power consumption required to mask the sound generated in the first space can be reduced.

Moreover, the headcount information may include a first detection result provided by each of one or more human detecting sensors that perform detection for the second space, and the controller may determine a total number of people present in the second space based on the first detection result.

Furthermore, the headcount information may include an activity schedule of each of one or more people for using the second space, and the controller determines a total number of people currently present in the second space by counting a total number of people currently scheduled to use the second space based on the activity schedule included in the headcount information.

Moreover, the obtainer may further obtain presence information about presence of a person in the first space, and when the controller determines that a person is not present in the first space based on the presence information, the controller may cause the one or more loudspeakers not to output the audio.

Accordingly, since audio is not outputted toward the second space when a person is not present in the first space, power consumption can be reduced.

Furthermore, the presence information may include a second detection result provided by each of one or more human detecting sensors that perform detection for the first space, and when the second detection result indicates that a person is not present in the first space, the controller may cause the one or more loudspeakers not to output the audio.

Moreover, the presence information may include an activity schedule of each of one or more people for using the first space, and when the controller determines that use of the first space is not currently scheduled based on the activity schedule of each of the one or more people included in the presence information, the controller may cause the one or more loudspeakers not to output the audio.

Furthermore, the obtainer may obtain sound data indicating a sound picked up by a microphone that picks up a sound in the second space, and the controller may store the sound data as the sound source data into the storage, and generate an audio to be outputted from the one or more loudspeakers, using the sound source data stored in the storage.

Accordingly, since audio to be outputted from the one or more loudspeakers is generated using the picked up sound as a sound source, a masking sound that only imparts a small sense of discomfort to people can be outputted.

Moreover, the obtainer may obtain first sound data and second sound data, the first sound data indicating a sound picked up by the microphone during a first time period, the second sound data indicating a sound picked up by the microphone during a second time period, and the controller may store the first sound data and the second sound data as the sound source data into the storage; generate an audio to be outputted from the one or more loudspeakers during the first time period, using the first sound data; and generate an audio to be outputted from the one or more loudspeakers during the second time period, using the second sound data.

Accordingly, since sound picked up in each time period is used as a sound source of audio to be outputted in the time period, a masking sound which is tailored to the time period and which only imparts a small sense of discomfort to people can be outputted.

Furthermore, the obtainer may obtain space information for determining the first space from among a plurality of spaces including the first space and the second space, and the controller may set each of the plurality of spaces as one of the first space or the second space based on the space information, and cause the one or more loudspeakers to reproduce the audio more loudly in one or more of the plurality of spaces each set as the second space than in one or more of the plurality of spaces each set as the first space.

Accordingly, a sound volume of the audio for masking the sound generated in the first space being used by people is adjusted to be lower with an increase in the loudness of the sound in the second space even when the first space and the second space are dynamically set. Therefore, the sound generated in the first space can be masked in an efficient manner.

An audio control method according to one aspect of the present disclosure includes: obtaining sound data indicating a sound picked up by a microphone disposed in a second space located in an area surrounding a first space used by a person; and causing one or more loudspeakers disposed in the first space or the second space to reproduce an audio obtained from the sound source data more loudly in the second space than in the first space. A loudness of the sound indicated in the sound data obtained is determined, and a sound volume of the audio outputted from the one or more loudspeakers is adjusted to be lower with an increase in the loudness of the sound determined.

Accordingly, since a sound volume of the audio for masking the sound generated in the first space is adjusted to be lower with an increase in the loudness of the sound picked up by the microphone in the second space, the sound generated in the first space can be masked in an efficient manner. Therefore, since power consumption required by masking can be reduced with an increase in the loudness of the sound in the second space, power consumption required to mask the sound generated in the first space can be reduced.

An audio control method according to one aspect of the present disclosure includes: obtaining headcount information about a total number of people present in a second space located in an area surrounding a first space used by a person; causing one or more loudspeakers disposed in the first space or the second space to reproduce an audio obtained from the sound source data more loudly in the second space than in the first space. A sound volume of the audio outputted from the one or more loudspeakers is adjusted to be lower with an increase in the total number of people based on the headcount information obtained.

Accordingly, since a sound volume of the audio for masking the sound generated in the first space is adjusted to be lower with an increase in the total number of people present in the second space, the sound generated in the first space can be masked in an efficient manner. Therefore, since power consumption required by masking can be reduced with an increase in the total number of people in the second space, power consumption required to mask the sound generated in the first space can be reduced.

It should be noted that these general or specific aspects may be realized as a device, an integrated circuit, a computer program, or may be realized as a computer-readable non-transitory recording medium such as a CD-ROM, or any combination thereof.

Hereinafter, an embodiment is described in detail with reference to the drawings as necessary. However, unnecessarily detailed description may be omitted. For example, detailed description of well-known matter or overlapping description of substantially identical elements may be omitted. This is to avoid unnecessary redundancy and provide easy-to-read descriptions for a person skilled in the art.

It should be noted that the accompanying drawings and the subsequent description are provided by the inventor in order for a person skilled in the art to sufficiently understand the present disclosure, and are thus not intended to limit the subject matter recited in the claims.

EMBODIMENT

1. Configuration

Figure 2:
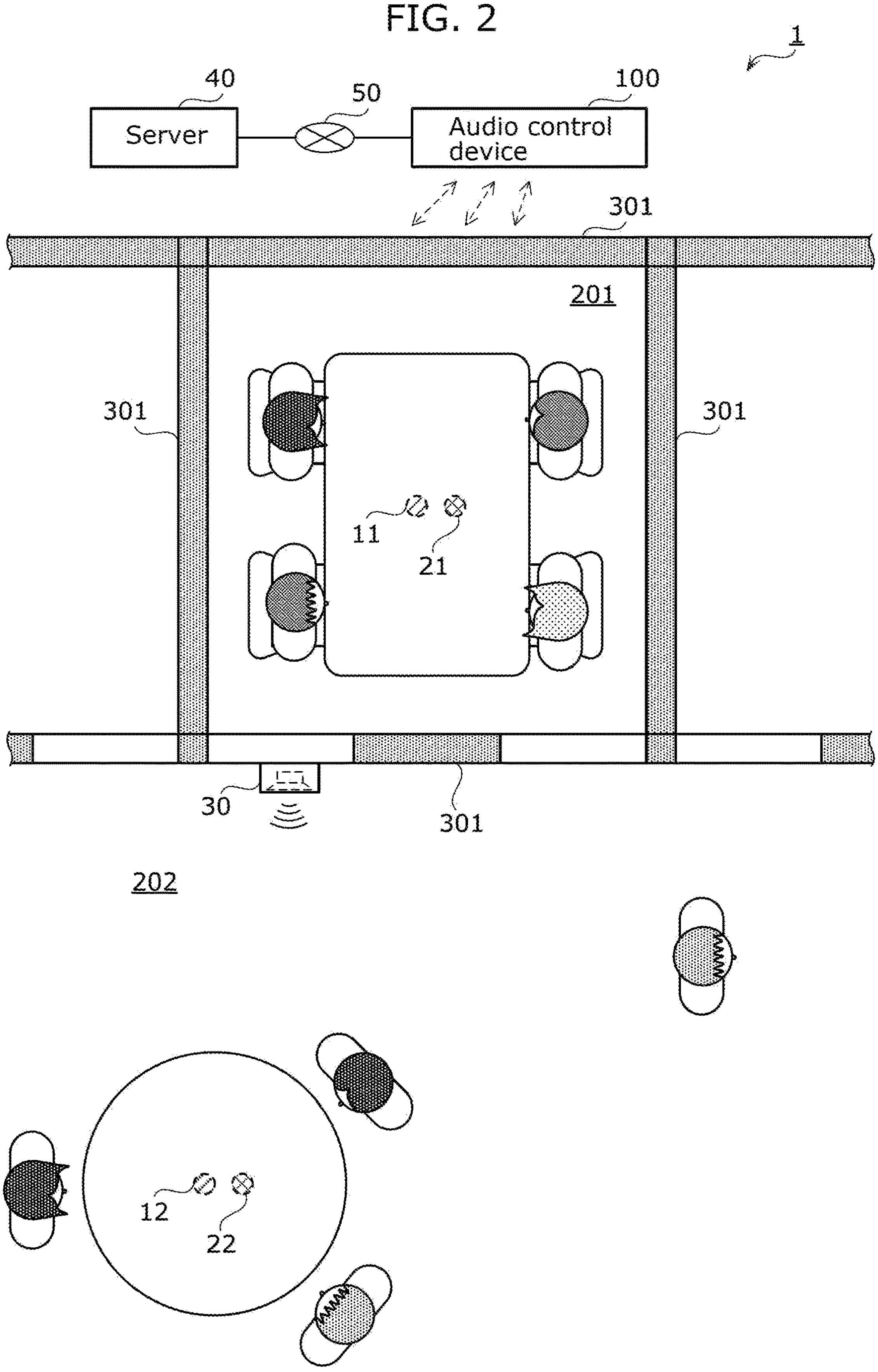
FIG. 2 is a diagram illustrating an example of usage of the audio control system according to the embodiment.

FIG. 1 is a diagram for describing a space to which an audio control system according to an embodiment is applied. FIG. 2 is a diagram illustrating an example of usage of the audio control system according to the embodiment. Note that FIG. 2 includes a schematic view in which the space in which the audio control system is used is viewed from above.

FIGS. 1 and 2 illustrate first space 201 surrounded by wall 301 and second space 202 surrounding first space 201. Loudspeaker 30 is disposed towards second space 202 on a boundary between first space 201 and second space 202. First space 201 is, for example, a space used as a conference space. Second space 202 is, for example, a space like a lobby where people come and go or where people take a temporary break.

FIG. 2 illustrates audio control system 1 including audio control device 100, microphones 11 and 12, human detecting sensors 21 and 22, and loudspeaker 30. In addition, FIG. 2 illustrates that audio control device 100 and server 40 are communicably connected to each other via network 50.

Microphone 11 is disposed in first space 201 and detects a sound generated inside first space 201. For example, microphone 11 is disposed on a ceiling of first space 201. Note that as long as a sound generated in first space 201 can be detected, microphone 11 is not limited to being disposed on the ceiling of first space 201 and may be disposed on a face on a side of first space 201 of wall 301, disposed on a floor of first space 201, or disposed on a desk disposed in first space 201. In other words, microphone 11 may be disposed on any structure inside first space 201.

Microphone 12 is disposed in second space 202 and detects a sound generated inside second space 202. For example, microphone 12 is disposed on a ceiling of second space 202. Note that as long as a sound generated in second space 202 can be detected, microphone 12 is not limited to being disposed on the ceiling of second space 202 and may be disposed on a face on a side of second space 202 of wall 301, disposed on a floor of second space 202, or disposed on a desk disposed in second space 202. In other words, microphone 12 may be disposed on any structure inside second space 202.

Human detecting sensor 21 is disposed in first space 201 and detects a presence of a person inside first space 201. In other words, a detection object of human detecting sensor 21 is first space 201. For example, human detecting sensor 21 detects the presence of a person by outputting infrared light, ultrasonic waves, visible light, or the like and detecting a reflected wave due to the person of the outputted infrared light, ultrasonic waves, visible light, or the like. For example, human detecting sensor 21 is disposed on a ceiling of first space 201. Note that as long as the presence of people inside first space 201 can be detected, human detecting sensor 21 is not limited to being disposed on the ceiling of first space 201 and may be disposed on a face on a side of first space 201 of wall 301.

Human detecting sensor 22 is disposed in second space 202 and detects a presence of people inside second space 202. In other words, a detection object of human detecting sensor 22 is second space 202. Human detecting sensor 22 may be capable of detecting the presence of a plurality of people and may detect a total number of one or more people present inside second space 202. For example, human detecting sensor 22 may be disposed on the ceiling of second space 202 and by outputting infrared light, visible light, or the like and detecting a reflected wave due to people of the outputted infrared light, visible light, or the like, human detecting sensor 22 may generate a two-dimensional image indicating a distribution of received light intensity of infrared light, visible light, or the like on a plane when viewed from above as a detection result. In addition, by analyzing the two-dimensional image obtained as a detection result, human detecting sensor 22 may determine a total number of people and generate the determined total number of people as a detection result. In this manner, human detecting sensor 22 may be an image-based human detecting sensor that detects positions and a total number of people on a plane from a two-dimensional image. Note that as long as the presence of people inside second space 202 can be detected, human detecting sensor 22 is not limited to being disposed on the ceiling of second space 202 and may be disposed on a face on a side of second space 202 of wall 301. When disposed on wall 301, human detecting sensor 22 may be disposed at a position close to the ceiling in an upper part of wall 301 so that one or more people present in second space 202 can be readily collectively detected.

Loudspeaker 30 outputs, toward second space 202, audio (masking sound) that makes it difficult for a person present in second space 202 to hear a sound generated in first space 201. In this case, for example, the sound generated in first space 201 is sound due to a conversation by a user who is using first space 201. The conversation by a user who is using first space 201 may be a conversation among a plurality of users who are using first space 201 or a conversation by a voice call using a communication terminal being performed between a user who is using first space 201 and a user who is outside of first space 201. For example, loudspeaker 30 is equipped with one speaker unit and an amplifier, amplifies an input audio signal by the amplifier, and outputs the amplified audio signal as audio from the speaker unit. Alternatively, loudspeaker 30 may be equipped with a speaker array made of a plurality of speaker units disposed in a specific direction and directionality of the loudspeaker 30 may be controllable in the specific direction.

Of microphones 11 and 12 and loudspeaker 30, positions or orientations of microphones 11 and 12 and loudspeaker 30 may be adjusted or a sound volume of loudspeaker 30 or sensitivities of microphones 11 and 12 may be adjusted so that microphones 11 and 12 less readily pick up sound outputted by loudspeaker 30.

Figures 3, 4:
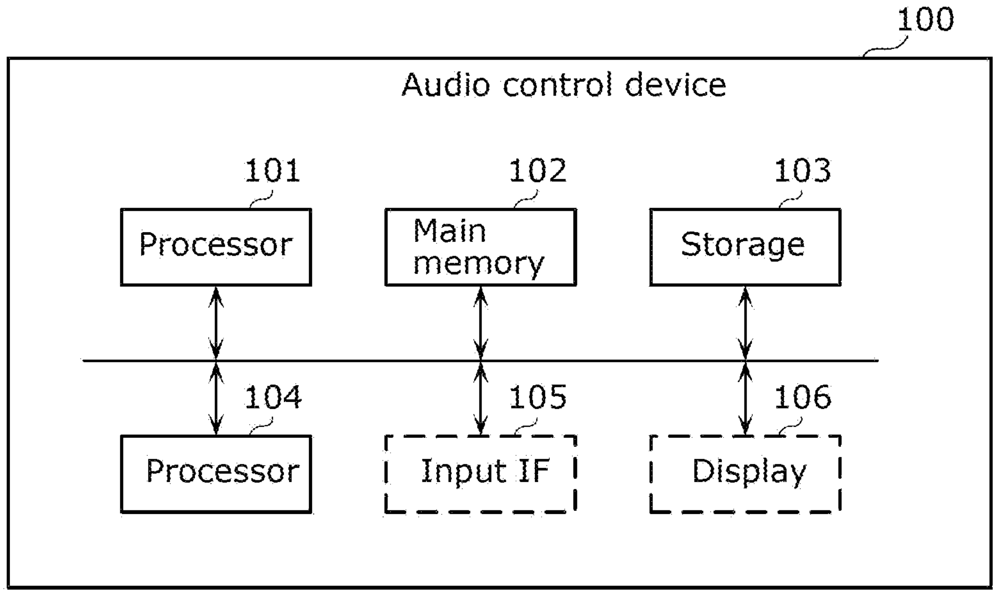
FIG. 3 is a diagram illustrating an example of reservation information according to the embodiment.
FIG. 4 is a block diagram illustrating an example of a hardware configuration of an audio control device according to the embodiment.

Server 40 accepts a usage reservation of first space 201 or second space 202 from a user and manages the usage reservation. More specifically, server 40 accepts usage reservations 401 and 402 such as illustrated in FIG. 3 from terminals of users (not illustrated) and stores accepted usage reservations 401 and 402 as reservation information 400. FIG. 3 is a diagram illustrating an example of reservation information according to the embodiment.

As illustrated in FIG. 3, each of usage reservations 401 and 402 included in reservation information 400 includes space identification information that identifies a space indicating the space that is scheduled to be used, time period information that indicates a time period on a scheduled day of use (in other words, the specific day), and user information that indicates users who are scheduled to use the space. The space identification information may be information that enables a space to be identified and may be a name of the space or a space ID for identifying the space. The user information includes a user ID for identifying a user having made a reservation of the space. The user information may include user IDs of all users who are scheduled to use the space or may include a total number of users who are scheduled to use the space. Server 40 stores an accepted usage reservation in a storage included in server 40. Server 40 accepts a new usage reservation so as not to overlap with a space and a time period for which a usage reservation has already been made. Since a usage reservation of a space indicates a schedule of a user for using the space for which the usage reservation has been made, the usage reservation of a space can be paraphrased as an activity schedule of the user.

Audio control device 100 obtains detection results from microphones 11 and 12 and human detecting sensors 21 and 22 and controls audio to be outputted from loudspeaker 30 in accordance with the obtained detection results. In addition, audio control device 100 obtains information from server 40 and controls audio to be outputted from loudspeaker 30 in accordance with the obtained information.

Next, a specific configuration of audio control device 100 will be described.

FIG. 4 is a block diagram illustrating an example of a hardware configuration of an audio control device according to the embodiment.

As illustrated in FIG. 4, as hardware components, audio control device 100 includes processor 101, main memory 102, storage 103, and communication IF (Interface) 104. Audio control device 100 may further include input IF (Interface) 105 and display 106.

Processor 101 is a processor for executing a program stored in storage 103 or the like.

Main memory 102 is a volatile storage area used to temporarily store data generated during processing by processor 101, used as a work area to be used when processor 101 executes a program, or used to temporarily store data received by communication IF 104. For example, data generated during processing by processor 101 includes audio data indicating audio generated by processor 101. For example, data received by communication IF 104 includes sound data obtained from microphones 11 and 12 and detection results obtained from human detecting sensors 21 and 22.

Storage 103 is a non-volatile storage area for storing various kinds of data such as programs. Storage 103 stores various kinds of data generated as a result of processing by processor 101 and sound data or data including a detection result or the like received by communication IF 104. In addition, storage 103 stores sound source data. Storage 103 may store sound source data received by communication IF 104.

Communication IF 104 is a communication interface for transmitting data to and from an external device such as a smartphone, a tablet, a PC (Personal Computer), and server 40. For example, communication IF 104 may be an interface for wireless communication such as a wireless LAN interface or a Bluetooth® interface. Communication IF 104 may be an interface for wired communication such as a USB (Universal Serial Bus) or a wired LAN interface. Note that communication IF 104 is not limited to the interfaces described above and may be a communication interface for transmitting data to and from an external device via a communication network. For example, communication IF 104 receives sound data from microphone 11 and 12 and receives detection results from human detecting sensors 21 and 22.

Input IF 105 is an interface for accepting input from a person. Input IF 105 may be a pointing device such as a mouse, a touchpad, a touch panel, or a trackball or a keyboard.

Display 106 is a liquid crystal display, an organic EL display, or the like.

Figure 5:
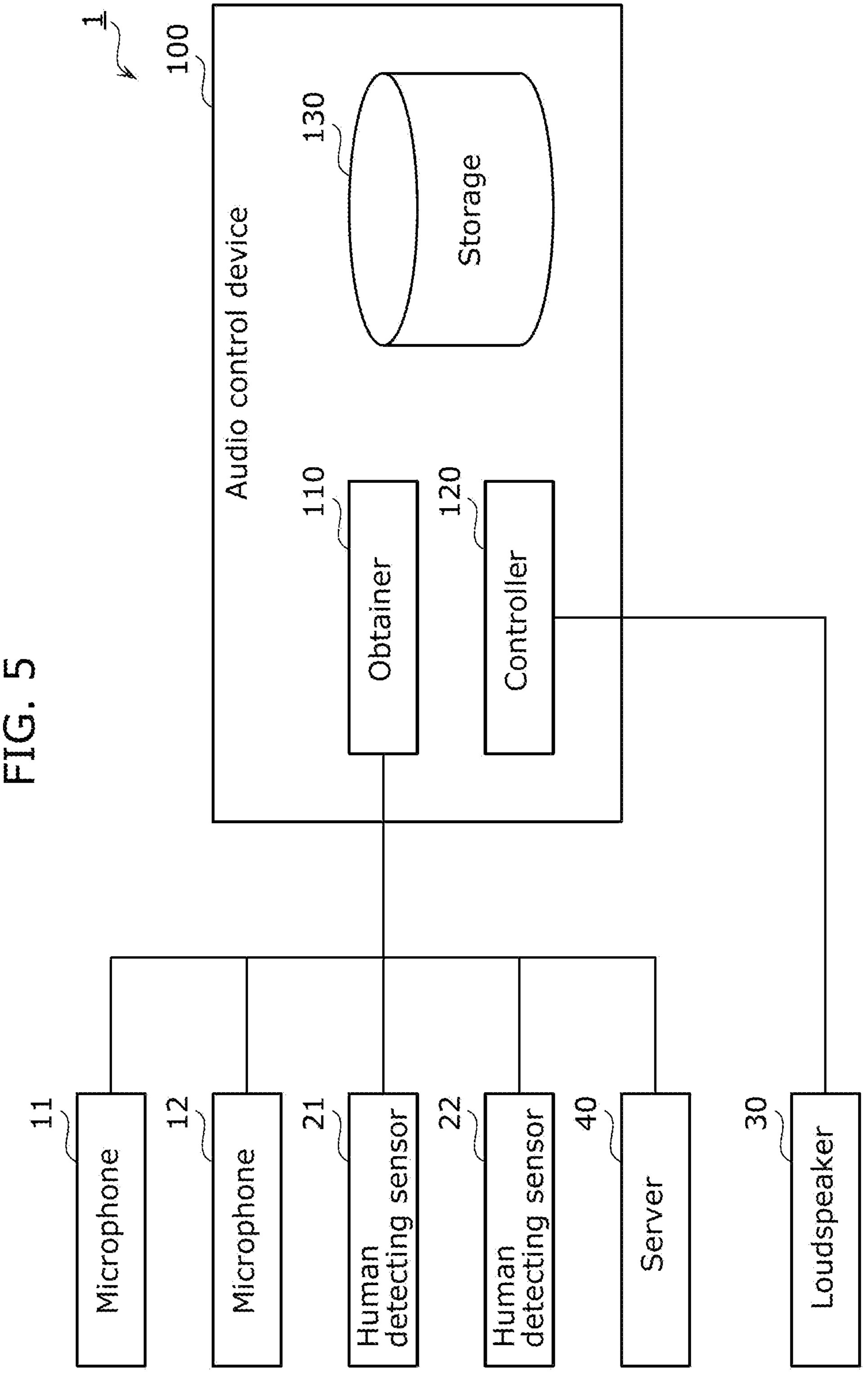
FIG. 5 is a block diagram illustrating an example of a functional configuration of the audio control device according to the embodiment.

FIG. 5 is a block diagram illustrating an example of a functional configuration of the audio control device according to the embodiment.

As illustrated in FIG. 5, audio control device 100 includes obtainer 110, controller 120, and storage 130.

Obtainer 110 obtains sound volume information related to a loudness of sound in second space 202. Obtainer 110 sequentially obtains sound volume information. The sound volume information is information used to determine the loudness of sound in second space 202. For example, obtainer 110 is realized by communication IF 104.

Controller 120 generates audio for masking sound generated in first space 201 from sound source data stored in storage 130. Controller 120 controls loudspeaker 30 so that the generated audio is reproduced louder in second space 202 than in first space 201. Since loudspeaker 30 is disposed so as to face second space 202 in the present embodiment, by performing control to output audio to loudspeaker 30, controller 120 can make the audio louder in second space 202 than in first space 201.

In addition, controller 120 adjusts a sound volume of the audio outputted from loudspeaker 30 to be lower with an increase in the loudness of the sound in second space 202 obtained based on the obtained sound volume information. Note that controller 120 sequentially processes sound volume information sequentially obtained by obtainer 110. In other words, controller 120 uses sound volume information obtained in real time to adjust, in real time, a sound volume of the audio outputted from loudspeaker 30.

The sound volume information may indicate an index value in an index related to the loudness of sound in second space 202. The sound volume information may indicate that the sound in second space 202 is louder when the index value is larger. For example, the sound volume information may be a measurement result of directly measuring the loudness of sound in second space 202 or may indicate an index value in another measurement index that is correlated to the loudness of sound. In this manner, when the sound volume information indicates an index value in an index related to the loudness of sound in second space 202, controller 120 adjusts a sound volume of the audio outputted from loudspeaker 30 to be lower with an increase in the sound volume information.

For example, controller 120 is realized as processor 101 uses main memory 102 to execute a program stored in storage 103.

Storage 130 stores sound source data. The sound source data is used by controller 120 to generate audio to be outputted from loudspeaker 30. The sound source data may be sound source data prepared in advance. For example, the sound source data prepared in advance may be ambient sound picked up in advance in nature, in the city, around a road, or the like or colored noise including white noise. In addition, the sound source data prepared in advance may be sound data indicating sound picked up by microphone 12 in advance. For example, storage 130 is realized by storage 103.

Note that the sound source data need not be sound source data prepared in advance and may be sound source data obtained by obtainer 110 from an external device via network 50. The sound source data obtained from an external device by obtainer 110 is stored in storage 130.

<Sound Volume Information and Control Corresponding to Sound Volume Information>

Specific examples of sound volume information and specific control examples by controller 120 with respect to each specific example of sound volume information will now be described.

First Example

A first example of sound volume information is sound data indicating a sound picked up by microphone 12 disposed in second space 202. In other words, obtainer 110 obtains sound data as sound volume information from microphone 12. In addition, controller 120 determines a loudness of the sound indicated in the sound data by analyzing the sound data and adjusts a sound volume of the audio outputted from loudspeaker 30 to be lower with an increase in the loudness of the sound determined.

For example, the loudness of sound indicated in sound data may be amplitude at a peak of an audio waveform in a predetermined period of the sound data. When there are a plurality of peaks in the predetermined period, the loudness of sound indicated in sound data may be a maximum value of amplitudes of the plurality of peaks, or an average value. The predetermined period is, for example, a period from a time of day preceding a present time of day (latest time of day) by a predetermined time to the present time of day. The predetermined period may indicate a time interval such as a time equal to or less than 100 seconds. In addition, the loudness of sound indicated in sound data may be amplitude at the present time of day of an envelope that tangentially connects a plurality of peaks of the audio waveform of the sound data, a maximum value in a predetermined period, or an average value.

Note that the loudness of sound indicated in sound data may be determined by a measuring device other than audio control device 100. The measuring device is a device for measuring a loudness of sound of sound data obtained by microphone 12. In this case, sound volume information is information indicating the loudness of sound in second space 202 as measured by the measuring device. In other words, obtainer 110 may obtain information indicating a loudness of sound from the measuring device as sound volume information. In addition, controller 120 may adjust a sound volume of the audio outputted from loudspeaker 30 to be lower with an increase in the loudness of the sound indicated by the information indicating the loudness of the sound.

Second Example

A second example of sound volume information is headcount information including a detection result by human detecting sensor 22 disposed in second space 202. In other words, obtainer 110 obtains headcount information as sound volume information from human detecting sensor 22. In addition, controller 120 adjusts a sound volume of audio outputted from loudspeaker 30 to be lower with an increase in the total number of people obtained from a detection result by human detecting sensor 22 included in the headcount information.

The headcount information may be a two-dimensional image indicating a distribution of received light intensity of infrared light, visible light, or the like on a plane or information indicating a total number of people determined by analyzing the two-dimensional image. When the headcount information is a two-dimensional image, controller 120 determines the total number of people by analyzing the two-dimensional image. For example, controller 120 may determine the total number of people by counting a set of pixels satisfying a predetermined condition. The predetermined condition is that, for example, in the case of an infrared image, the number of pixels in a set of pixels having a pixel value corresponding to a body temperature of a person being within a range of the number of pixels corresponding to an area where a single person is shown. In addition, for example, controller 120 may determine the total number of people in the two-dimensional image using a machine learning model. For example, the machine learning model may be a model for determining the number of people shown in the two-dimensional image and may be a model obtained by machine-learning correct answer data indicating a plurality of two-dimensional images for learning and the number of people shown in each of the two-dimensional images for learning. In addition, for example, the machine learning model may be a model for determining a region showing people in the two-dimensional image and may be a model obtained by learning correct answer data indicating a plurality of two-dimensional images for learning and a region where people are present in each of the two-dimensional images for learning. When determining a region showing people, controller 120 determines the total number of people by counting the determined regions. As described above, controller 120 determines the total number of people present in second space 202 based on a detection result of human detecting sensor 22.

Third Example

A third example of sound volume information is headcount information including an activity schedule of each of one or more people for using second space 202. More specifically, an activity schedule of each of one or more people is indicated by usage reservation of a space that is managed by server 40. Obtainer 110 obtains reservation information indicating a usage reservation of a space from server 40. The reservation information indicates an activity schedule of each of one or more people including an activity schedule for using second space 202. Therefore, reservation information can be considered a type of headcount information.

In addition, controller 120 determines a total number of people currently present in second space 202 by counting a total number of people currently scheduled to use second space 202 based on the reservation information obtained from server 40. Controller 120 adjusts a sound volume of the audio outputted from loudspeaker 30 to be lower with an increase in the determined total number of people present in second space 202.

Note that the reservation information may include a total number of people scheduled to use a space. In this case, controller 120 may determine the total number of people scheduled to use second space 202 included in the reservation information to be the total number of people present in second space 202.

<Presence Information and Control Corresponding to Presence Information>

Controller 120 may further control output of audio from loudspeaker 30 in accordance with a presence of a person in first space 201. More specifically, when a person is present in first space 201, controller 120 outputs audio from loudspeaker 30, but when a person is not present in first space 201, controller 120 does not output audio from loudspeaker 30.

In this case, obtainer 110 further obtains presence information about a presence of a person in first space 201. In addition, controller 120 determines whether or not a person is present in first space 201 based on the presence information. When controller 120 determines that a person is not present in first space 201 (in other words, controller 120 identifies that a person is not present in first space 201), controller 120 does not output audio from loudspeaker 30. For example, when controller 120 determines that a person is not present in first space 201 in a state where audio is being outputted from loudspeaker 30, controller 120 stops output of the audio from loudspeaker 30. For example, when controller 120 determines that a person is not present in first space 201 in a state where audio is not being outputted from loudspeaker 30, controller 120 continues not to output audio from loudspeaker 30.

Conversely, when controller 120 determines that a person is present in first space 201 (in other words, controller 120 identifies that a person is not present in first space 201), controller 120 outputs audio from loudspeaker 30. For example, when controller 120 determines that a person is present in first space 201 in a state where audio is being outputted from loudspeaker 30, controller 120 continues to output the audio from loudspeaker 30. For example, when controller 120 determines that a person is present in first space 201 in a state where audio is not being outputted from loudspeaker 30, controller 120 starts to output audio from loudspeaker 30.

Note that presence information may include a detection result by human detecting sensor 21 disposed in first space 201. In other words, obtainer 110 obtains a detection result by human detecting sensor 21 as presence information from human detecting sensor 21. In addition, when the detection result obtained by obtainer 110 indicates that a person is not present in first space 201, controller 120 does not output audio from loudspeaker 30.

Furthermore, the presence information may include an activity schedule of each of one or more people for using first space 201. In other words, obtainer 110 obtains reservation information indicating a usage reservation of a space from server 40. The reservation information indicates an activity schedule of each of one or more people including an activity schedule for using first space 201. Therefore, reservation information can be considered a type of presence information. In addition, controller 120 determines whether or not use of first space 201 is currently scheduled based on the reservation information obtained from server 40. When controller 120 determines that use of first space 201 is scheduled, controller 120 determines that a person is present in first space 201. Therefore, in this case, controller 120 outputs audio from loudspeaker 30. On the other hand, when controller 120 determines that use of first space 201 is not scheduled, controller 120 determines that a person is not present in first space 201. Therefore, in this case, controller 120 does not output audio from loudspeaker 30.

2. Operation

Next, an operation of audio control device 100 according to the embodiment will be described.

Figure 6:
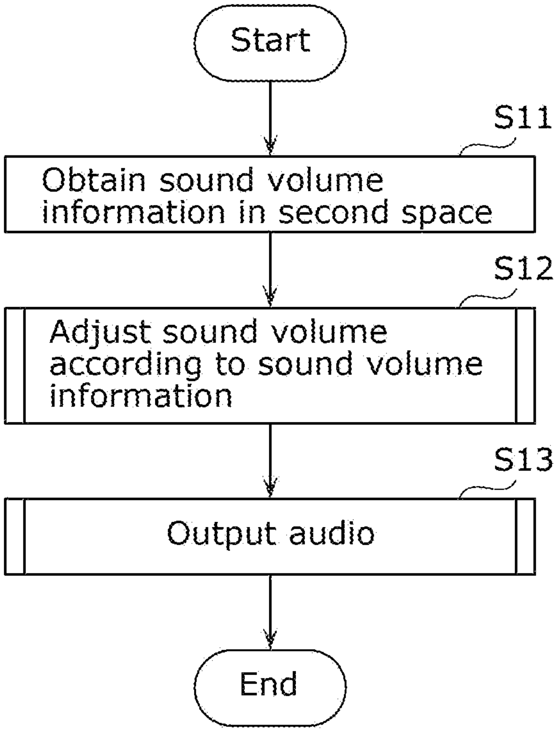
FIG. 6 is a flow chart illustrating an example of an audio control method by the audio control device according to the embodiment.

FIG. 6 is a flow chart illustrating an example of an audio control method by the audio control device according to the embodiment.

First, obtainer 110 obtains sound volume information related to a loudness of sound in second space 202 (S11).

Next, controller 120 adjusts a sound volume of the audio outputted from loudspeaker 30 to be lower with an increase in the loudness of the sound in second space 202 obtained based on the obtained sound volume information (S12).

Next, controller 120 outputs audio from loudspeaker 30 at the adjusted sound volume (S13).

Next, specific examples (first example to third example) of control for adjusting the sound volume in step S12 will be described.

Figure 7:
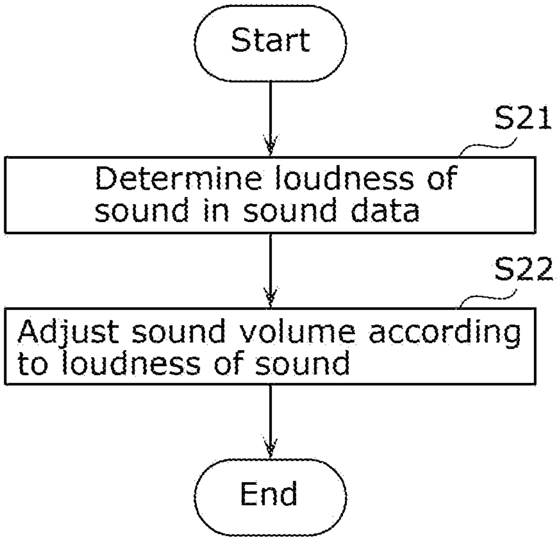
FIG. 7 is a flow chart illustrating a first example of control for adjusting a sound volume according to the embodiment.

FIG. 7 is a flow chart illustrating a first example of control for adjusting a sound volume according to the embodiment. A first example is an example of a case where sound volume information is sound data indicating a sound picked up by microphone 12. In other words, in the first example, in step S11, it is assumed that obtainer 110 has obtained sound data indicating a sound picked up by microphone 12 as sound volume information.

In the first example, in step S12, controller 120 first determines a loudness of a sound indicated in the sound data by analyzing the sound data (S21).

In addition, controller 120 adjusts a sound volume of the audio outputted from loudspeaker 30 to be lower with an increase in the loudness of the sound determined (S22).

Figure 8:
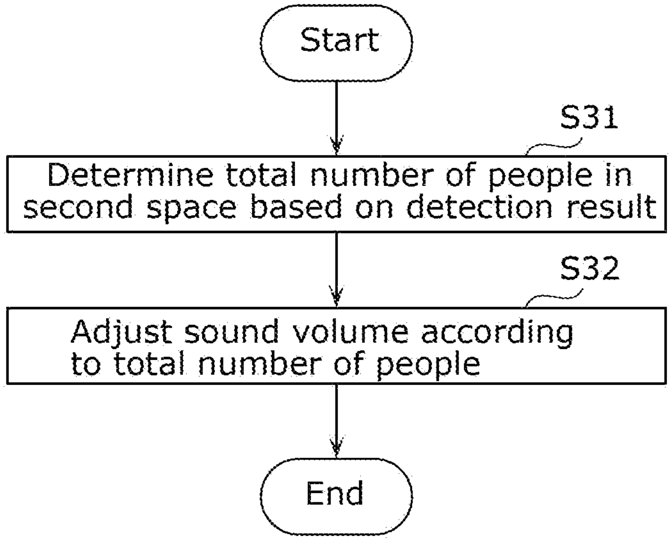
FIG. 8 is a flow chart illustrating a second example of control for adjusting a sound volume according to the embodiment.

FIG. 8 is a flow chart illustrating a second example of control for adjusting a sound volume according to the embodiment. A second example is an example of a case where sound volume information is headcount information including a detection result by human detecting sensor 22 disposed in second space 202. In other words, in the second example, in step S11, it is assumed that obtainer 110 has obtained headcount information as sound volume information from human detecting sensor 22.

In the second example, in step S12, controller 120 first determines a total number of people present in second space 202 by analyzing a two-dimensional image that is a detection result by human detecting sensor 22 (S31).

In addition, controller 120 adjusts a sound volume of the audio outputted from loudspeaker 30 to be lower with an increase in the total number of people present in second space 202 (S32).

Figure 9:
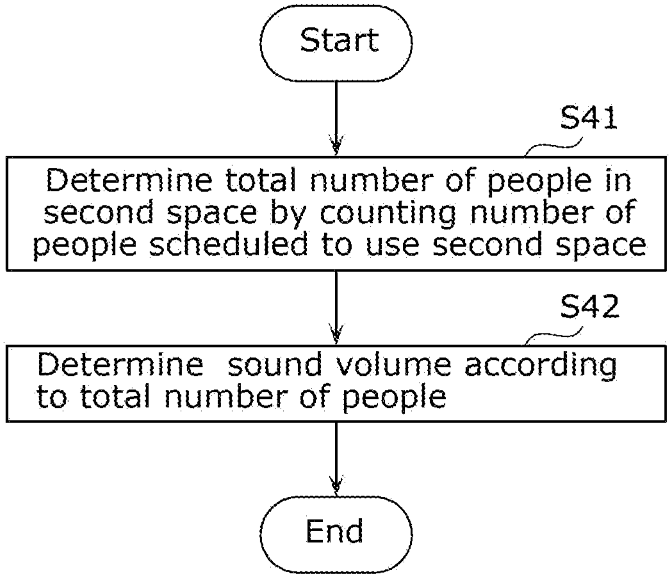
FIG. 9 is a flow chart illustrating a third example of control for adjusting a sound volume according to the embodiment.

FIG. 9 is a flow chart illustrating a third example of control for adjusting a sound volume according to the embodiment. The third example is an example of a case where sound volume information is headcount information including an activity schedule of each of one or more people for using second space 202. In other words, in the third example, in step S11, it is assumed that obtainer 110 has obtained reservation information as sound volume information from server 40.

In the third example, in step S12, controller 120 first determines a total number of people currently present in second space 202 by counting a total number of people currently scheduled to use second space 202 based on the reservation information (S41).

In addition, controller 120 adjusts a sound volume of the audio outputted from loudspeaker 30 to be lower with an increase in the total number of people present in second space 202 (S42).

Next, output control of audio corresponding to presence information will be described. The output control of audio is performed in parallel while the audio control method is being executed.

Figure 10:
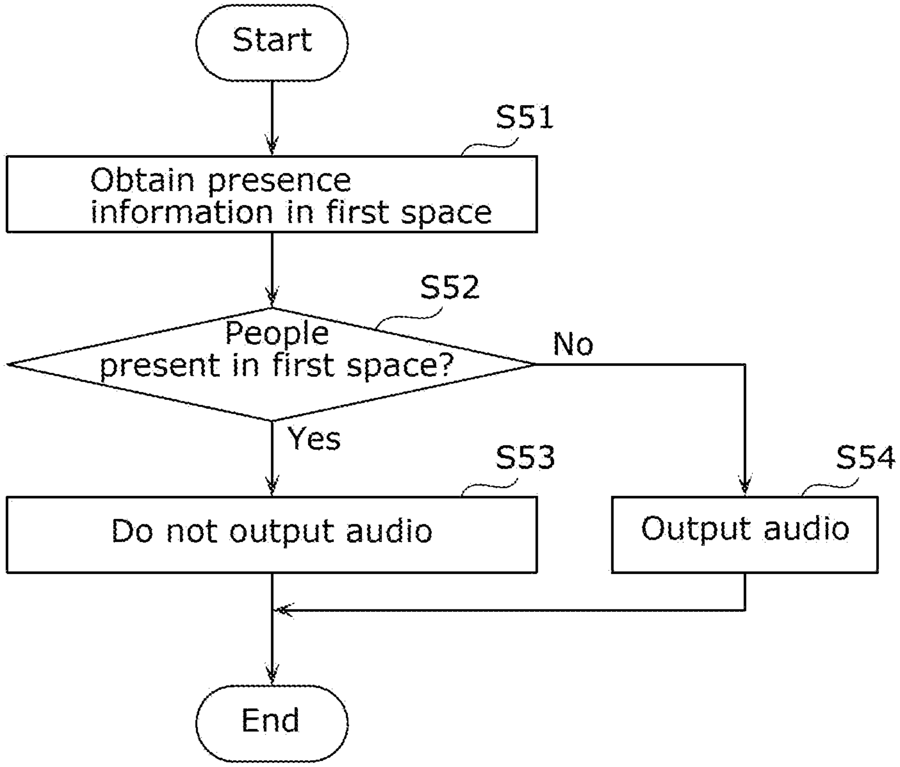
FIG. 10 is a flow chart illustrating an example of output control of audio corresponding to presence information according to the embodiment.

FIG. 10 is a flow chart illustrating an example of output control of audio corresponding to presence information according to the embodiment.

First, obtainer 110 obtains presence information about a presence of a person in first space 201 (S51).

Next, controller 120 determines whether or not a person is present in first space 201 based on the presence information (S52).

When controller 120 determines that a person is present in first space 201 (Yes in S52), controller 120 does not output audio from loudspeaker 30 (S53). In other words, in a state where audio is being outputted from loudspeaker 30, controller 120 stops output of the audio from loudspeaker 30. Alternatively, in a state where audio is not being outputted from loudspeaker 30, controller 120 continues not to output audio from loudspeaker 30.

When controller 120 determines that a person is not present in first space 201 (No in S52), controller 120 outputs audio from loudspeaker 30 (S54). Note that the audio outputted from loudspeaker 30 in step S54 is adjusted to the sound volume adjusted in step S12. In other words, in a state where audio is being outputted from loudspeaker 30, controller 120 continues to output audio from loudspeaker 30. Alternatively, in a state where audio is not being outputted from loudspeaker 30, controller 120 starts to output audio from loudspeaker 30.

3. Advantageous Effects and the Like

With audio control system 1 according to the present embodiment, since a sound volume of the audio for masking a sound generated in first space 201 is adjusted to be lower with an increase in a loudness of a sound in second space 202, the sound generated in first space 201 can be masked in an efficient manner. Therefore, power consumption required by masking can be reduced with an increase in the loudness of the sound in second space 202 and power consumption required to mask the sound generated in first space 201 can be reduced.

In addition, in audio control system 1 according to the present embodiment, obtainer 110 obtains sound data indicating a sound picked up by microphone 12 disposed in second space 202 as sound volume information. Controller 120 determines a loudness of the sound indicated in the sound data and adjusts a sound volume of audio for masking a sound generated in first space 201 to be lower with an increase in the loudness of the sound determined. Accordingly, since the sound volume of the audio for masking the sound generated in first space 201 is adjusted to be lower with an increase in the loudness of the sound picked up by microphone 12 in second space 202, the sound generated in first space 201 can be masked in an efficient manner.

In addition, in audio control system 1 according to the present embodiment, since a sound volume of the audio for masking the sound generated in first space 201 is adjusted to be lower with an increase in a total number of people present in second space 202, the sound generated in first space 201 can be masked in an efficient manner.

Furthermore, in audio control system 1 according to the present embodiment, obtainer 110 further obtains presence information about a presence of a person in first space 201. When controller 120 determines that a person is not present in first space 201 based on the presence information, controller 120 does not output audio for masking a sound generated in first space 201 from loudspeaker 30. Accordingly, since audio for masking is not outputted toward second space 202 when a person is not present in first space 201, power consumption can be reduced.

4. Variations of Embodiment

First Variation

While the sound source data is assumed to be sound source data prepared in advance in the embodiment described above, sound source data is not limited thereto. The sound source data may be regularly updated to sound data indicating sound picked up by microphone 12.

Specific processing will be described.

Obtainer 110 obtains sound data indicating a sound picked up by microphone 12. A timing at which obtainer 110 obtains sound data from microphone 12 may be a regular timing such as every month or every two months or a timing at which an instruction from the user is accepted.

Controller 120 causes the sound data obtained by obtainer 110 to be stored by storage 130 as sound source data. In addition to the sound source data stored in storage 130, controller 120 may cause sound data newly obtained by obtainer 110 to be stored by storage 130 as sound source data. Furthermore, controller 120 may update sound source data stored in storage 130 to sound data newly obtained by obtainer 110. When causing storage 130 to store sound data newly obtained by obtainer 110 as sound source data in addition to the sound source data stored in storage 130, controller 120 may cause the new sound data to be stored as sound source data and may sequentially delete sound source data stored in storage 130 from oldest to newest.

Controller 120 generates audio to be outputted from loudspeaker 30 using sound source data stored in storage 130.

When updating sound data, sound data may be picked up for each time period, and the picked-up sound data may be stored in storage 130 as sound source data used when generating audio to be outputted in the time period.

Obtainer 110 obtains first sound data indicating a sound picked up by microphone 12 during a first time period and second sound data indicating a sound picked up by microphone 12 during a second time period. The first time period and the second time period are, for example, time periods in a day. For example, the first time period is a time period from 8:00 AM to 10:00 AM. For example, the second time period is a time period from 10:00 AM to noon. Note that time periods in a day other than the time periods described above may be set. In other words, time periods in a day are not limited to two or more time periods and may include three or more time periods. In addition, the time periods may be time periods that do not overlap with each other.

Controller 120 causes storage 130 to store the first sound data and the second sound data as sound source data. More specifically, controller 120 causes storage 130 to store the first sound data as first sound source data of audio to be outputted in the first time period and causes storage 130 to store the second sound data as second sound source data of audio to be outputted in the second time period.

In addition, controller 120 generates audio to be outputted in the first time period from loudspeaker 30 using the first sound data and outputs the generated audio from loudspeaker 30 in the first time period. Furthermore, controller 120 generates audio to be outputted in the second time period from loudspeaker 30 using the second sound data and outputs the generated audio from loudspeaker 30 in the second time period.

Next, sound pick-up control of audio control device 100 according to the first variation of the embodiment will be described.

Figure 11:
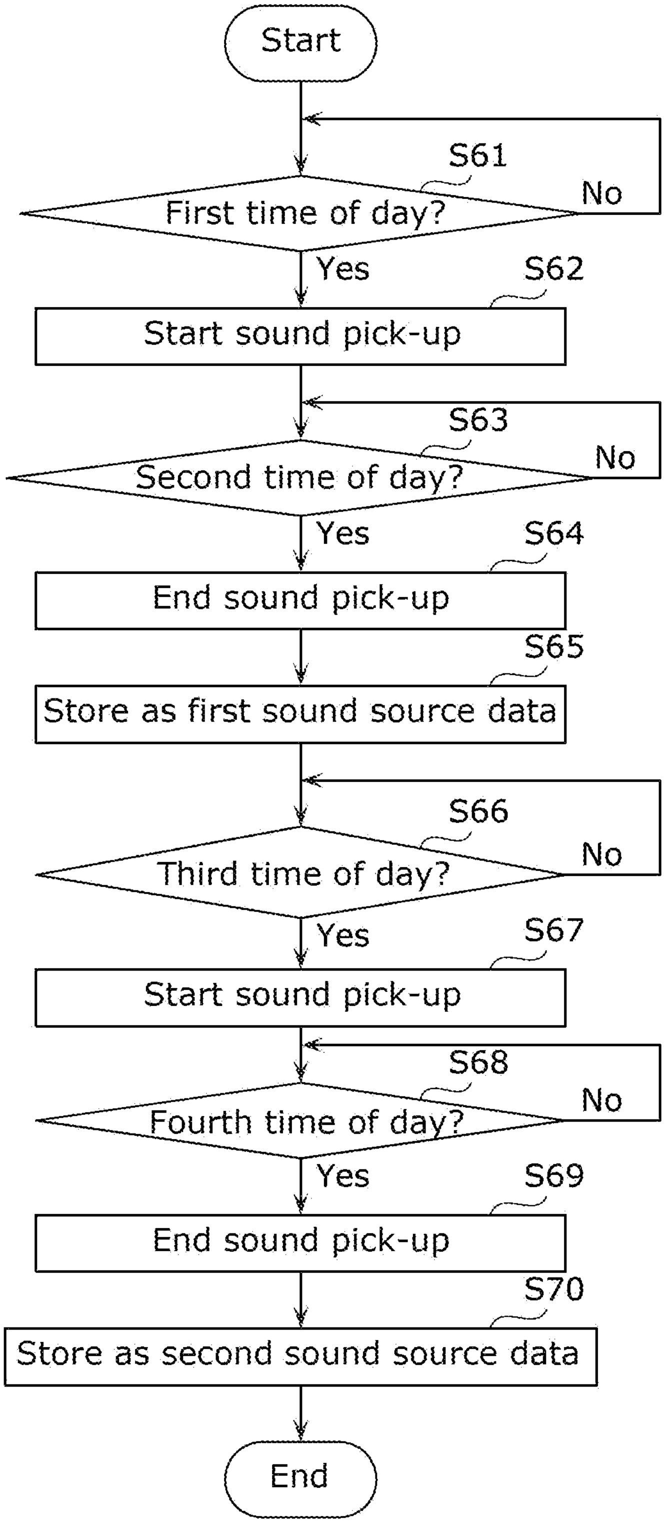
FIG. 11 is a flow chart illustrating an example of sound pick-up control by an audio control device according to a first variation of the embodiment.

FIG. 11 is a flow chart illustrating an example of sound pick-up control by an audio control device according to the first variation of the embodiment.

First, controller 120 determines whether or not the present time of day is a first time of day (S61). The first time of day is a time of day included in the first time period. For example, the first time of day may be 8:00 AM.

When controller 120 determines that the present time of day is the first time of day (Yes in S61), controller 120 starts sound pick-up by microphone 12 (S62). When controller 120 determines that the present time of day is not the first time of day (No in S61), controller 120 returns to step S61.

Controller 120 determines whether or not the present time of day is a second time of day (S63). The second time of day is a time of day that occurs when a first time elapses after the first time of day among the times of day included in the first time period. For example, the second time of day may be 9:00 AM. The first time is a time with a first length.

When controller 120 determines that the present time of day is the second time of day (Yes in S63), controller 120 ends sound pick-up by microphone 12 (S64). Accordingly, obtainer 110 obtains first sound data indicating a sound picked up by microphone 12 in the first time period. When controller 120 determines that the present time of day is not the second time of day (No in S63), controller 120 returns to step S63.

Next, controller 120 causes storage 130 to store the obtained first sound data as first sound source data (S65).

In this manner, controller 120 causes obtainer 110 to obtain a detection result by microphone 12 from the first time of day to the second time of day. Accordingly, obtainer 110 obtains the first sound data from microphone 12 and controller 120 causes storage 130 to store the first sound data. Controller 120 manages, as first sound source data, the first sound data stored in storage 130.

Next, controller 120 determines whether or not the present time of day is a third time of day (S66). The third time of day is a time of day included in the second time period. For example, the third time of day may be 10:00 AM.

When controller 120 determines that the present time of day is the third time of day (Yes in S66), controller 120 starts sound pick-up by microphone 12 (S67). When controller 120 determines that the present time of day is not the third time of day (No in S66), controller 120 returns to step S66.

Controller 120 determines whether or not the present time of day is a fourth time of day (S68). The fourth time of day is a time of day that occurs when a second time elapses after the third time of day among the times of day included in the second time period. For example, the fourth time of day may be 11:00 AM. Note that the first time and the second time indicate time intervals and may be times of a same length or times of which lengths differ from each other.

When controller 120 determines that the present time of day is the fourth time of day (Yes in S68), controller 120 ends sound pick-up by microphone 12 (S69). Accordingly, obtainer 110 obtains second sound data indicating a sound picked up by microphone 12 in the second time period. When controller 120 determines that the present time of day is not the fourth time of day (No in S68), controller 120 returns to step S68.

Next, controller 120 causes storage 130 to store the obtained second sound data as second sound source data (S70).

In this manner, controller 120 causes obtainer 110 to obtain a detection result by microphone 12 from the third time of day to the fourth time of day. Accordingly, obtainer 110 obtains the second sound data from microphone 12 and controller 120 causes storage 130 to store the second sound data. Controller 120 manages, as second sound source data, the second sound data stored in storage 130.

Next, output control of audio control device 100 according to the first variation of the embodiment will be described.

Figure 12:
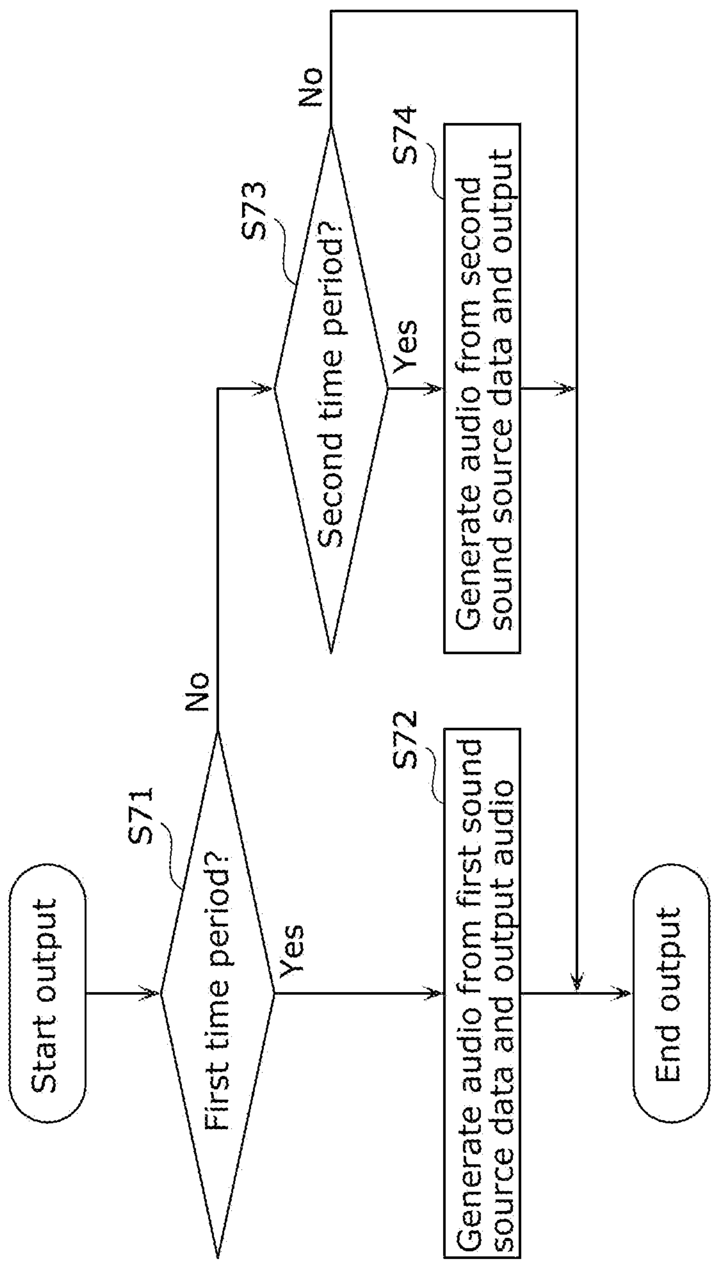
FIG. 12 is a flow chart illustrating an example of output control by the audio control device according to the first variation of the embodiment.

FIG. 12 is a flow chart illustrating an example of output control by the audio control device according to the first variation of the embodiment.

First, controller 120 determines whether or not the present time of day is included in the first time period (S71).

When the present time of day is included in the first time period (Yes in S71), controller 120 generates audio for making a sound generated in first space 201 using the first sound data that is managed as first sound source data in storage 130, and outputs the generated audio from loudspeaker 30 (S72). While audio is generated during the first time period in step S72, the generation of audio is not limited thereto. Controller 120 may generate first audio data indicating audio using the first sound data and store the generated first audio data in storage 130 in advance, and output audio based on the first audio data to loudspeaker 30 in the first time period.

When the present time of day is not included in the first time period (No in S71), controller 120 determines whether or not the present time of day is included in the second time period (S73).

When the present time of day is included in the second time period (Yes in S73), controller 120 generates audio for making a sound generated in first space 201 using the second sound data that is managed as second sound source data in storage 130, and outputs the generated audio from loudspeaker 30 (S74). While audio is generated during the second time period in step S74, the generation of audio is not limited thereto. Controller 120 may generate second audio data indicating audio using the second sound data and store the generated second audio data in storage 130 in advance, and output audio based on the second audio data to loudspeaker 30 in the second time period.

When the present time of day is not included in the second time period (No in S73), controller 120 ends the output control.

Second Variation

When adopting sound data indicating a sound picked up by microphone 12 disposed in second space 202 as sound source data, there may be cases where a conversation by a person is picked up in second space 202. When a conversation by a person is picked up as sound source data, there is a risk that the picked-up conversation by a person may be outputted from loudspeaker 30 to second space 202. In consideration thereof, when sound data includes a conversation by a person, the sound data may be processed so that the included conversation by a person can no longer be recognized and the sound data after processing may be stored in storage 130 as sound source data.

A specific example of processing of sound data will be described.

Controller 120 executes processing of analyzing sound data indicating a sound picked up by microphone 12 and detecting a conversation by a person from the sound data. For example, controller 120 determines whether or not a waveform in a band of a human voice (for example, a band ranging from 150 Hz to 1 kHz in frequency) of the sound data includes a portion in which sound pressure exceeds a predetermined threshold. When controller 120 determines that the waveform includes a portion in which sound pressure exceeds the predetermined threshold, controller 120 detects the portion in which sound pressure exceeds the predetermined threshold as a portion including a conversation by a person. Alternatively, controller 120 may execute audio recognition processing and detect a portion including a sound recognized as a word among the sound data as a portion including a conversation by a person.

Controller 120 lowers sound pressure of a band of voice in the portion including the conversation by a person among the sound data by an amount corresponding to predetermined sound pressure or so as to equal predetermined sound pressure and composites noise at least including the band of voice to the portion. Accordingly, sound data processed so that the conversation by a person cannot be recognized is obtained. Controller 120 stores the sound data after composition in storage 130 as sound source data.

Third Variation

While first space 201 to be an object of masking and second space 202 surrounding first space 201 are fixed spaces in the embodiment described above, the first space and the second space are not limited thereto and may be dynamically changed.

Figure 13:
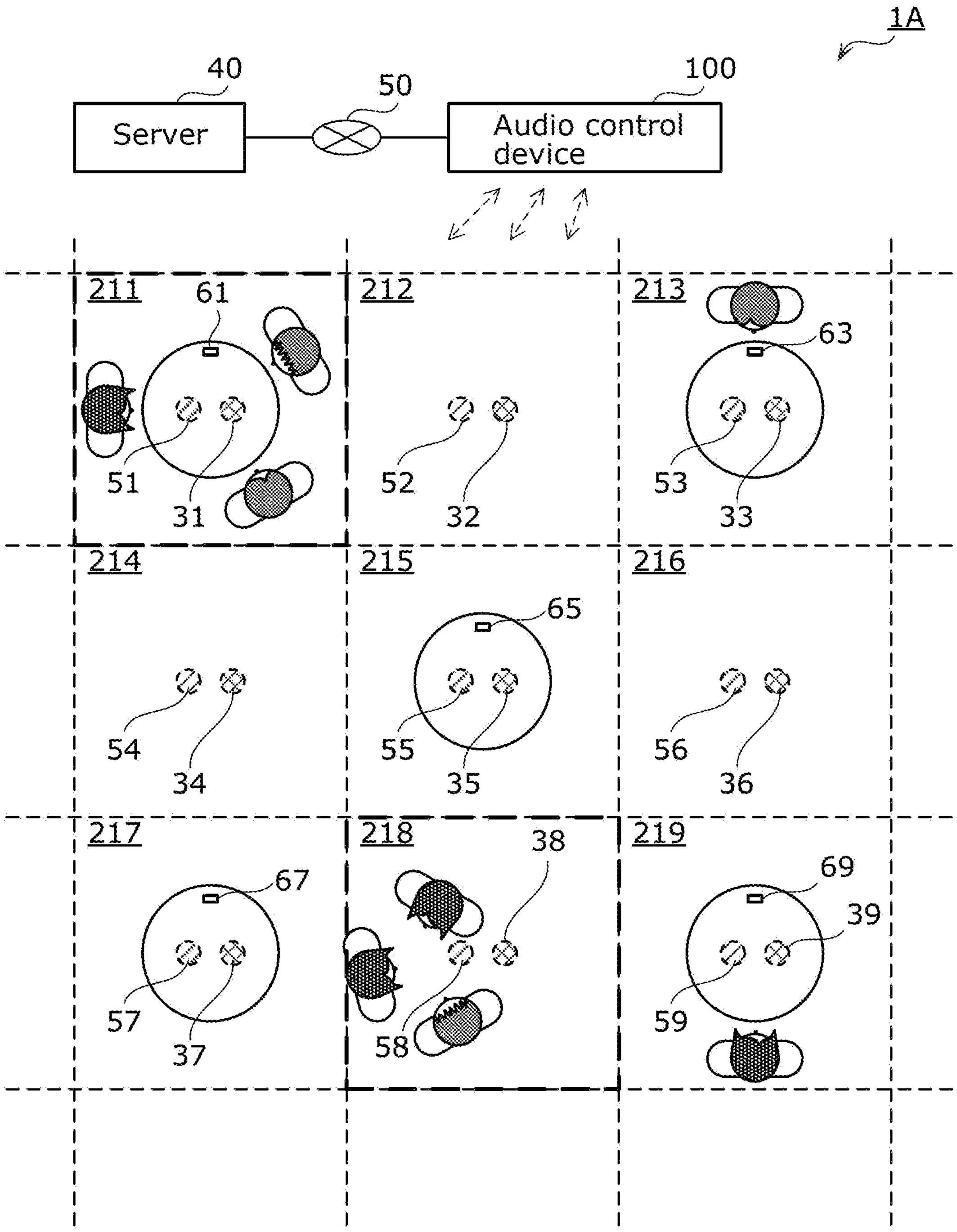
FIG. 13 is a diagram illustrating an example of usage of an audio control system according to a third variation of the embodiment.

FIG. 13 is a diagram illustrating an example of usage of an audio control system according to a third variation of the embodiment. Note that FIG. 13 includes a schematic view in which the space where the audio control system is used is viewed from above.

FIG. 13 illustrates audio control system 1A equipped with audio control device 100, loudspeakers 31 to 39, microphones 51 to 59, and switches 61, 63, 65, 67, and 69 disposed on tables. In addition, FIG. 13 illustrates that audio control device 100 and server 40 are communicably connected to each other via network 50.

In FIG. 13, the space is divided into a plurality of (for example, nine) spaces 211 to 219. Loudspeaker 31 and microphone 51 are disposed on a ceiling of space 211 and switch 61 is provided on a table disposed in space 211. In addition, loudspeaker 32 and microphone 52 are disposed on a ceiling of space 212. Loudspeaker 33 and microphone 53 are disposed on a ceiling of space 213 and switch 63 is provided on a table disposed in space 213. In addition, loudspeaker 34 and microphone 54 are disposed on a ceiling of space 214. Loudspeaker 35 and microphone 55 are disposed on a ceiling of space 215 and switch 65 is provided on a table disposed in space 215. In addition, loudspeaker 36 and microphone 56 are disposed on a ceiling of space 216. Loudspeaker 37 and microphone 57 are disposed on a ceiling of space 217 and switch 67 is provided on a table disposed in space 217. In addition, loudspeaker 38 and microphone 58 are disposed on a ceiling of space 218. Loudspeaker 39 and microphone 59 are disposed on a ceiling of space 219 and switch 69 is provided on a table disposed in space 219.

Based on sound data indicating sounds picked up by microphones 51 to 59 or on/off information obtained from switches 61, 63, 65, 67, and 69, audio control device 100 determines a space to be set as a first space and a space to be set as a second space among spaces 211 to 219. In addition, audio control device 100 controls loudspeakers 31 to 39 so that audio is outputted louder in the set second space than in the set first space.

Hereinafter, specific functions of each processing device will be described.

Obtainer 110 obtains space information for determining the first space among spaces 211 to 219. More specifically, obtainer 110 may obtain sound data indicating sounds picked up by microphones 51 to 59 as space information. Alternatively, obtainer 110 may obtain on/off information obtained from switches 61, 63, 65, 67, and 69 as space information. On/off information is information indicating whether each switch is in an on-state or an off-state.

Controller 120 executes processing of analyzing sound data obtained by obtainer 110 to detect a portion including a conversation by a person from the sound data. This processing is similar to the processing in the second variation. Controller 120 may set a space in which the microphone having picked up sound data in which a portion including a conversation by a person has been detected is disposed among spaces 211 to 219 as the first space.

In addition, based on the on/off information obtained by obtainer 110, controller 120 may set a space in which the table provided with a switch indicating an on-state is disposed among spaces 211, 213, 215, 217, and 219 as the first space.

Furthermore, controller 120 may set a space excluding the space set as the first space among spaces 211 to 219 as the second space. Alternatively, controller 120 may set a space in which the microphone having picked up sound data in which a portion including a conversation by a person has not been detected is disposed among spaces 211 to 219 as the second space. In addition, based on the on/off information obtained by obtainer 110, controller 120 may set a space in which the table provided with a switch indicating an off-state is disposed among spaces 211, 213, 215, 217, and 219 as the second space.

Controller 120 outputs audio from one or more loudspeakers disposed in a space set as the second space among spaces 211 to 219 but does not output audio from one or more loudspeakers disposed in a space set as the first space among spaces 211 to 219. Accordingly, controller 120 controls loudspeakers 31 to 39 so that audio is outputted louder in one or more spaces set as the second space than in one or more spaces set as the first space among spaces 211 to 219.

Note that controller 120 may make a sound volume of audio outputted from one or more loudspeakers disposed in a space set as the second space among spaces 211 to 219 louder than a sound volume of audio outputted from one or more loudspeakers disposed in a space set as the first space among spaces 211 to 219.

Figure 14:
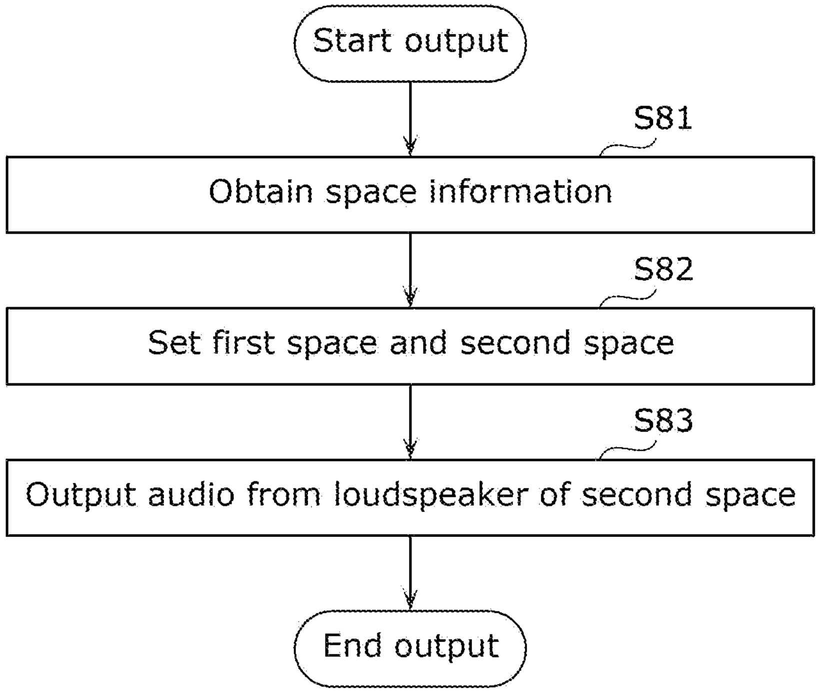
FIG. 14 is a flow chart illustrating an example of control for setting a space by an audio control device according to the third variation of the embodiment.

FIG. 14 is a flow chart illustrating an example of control for setting a space by an audio control device according to the third variation of the embodiment.

First, obtainer 110 obtains space information from microphones 51 to 59 and switches 61, 63, 65, 67, and 69 (S81).

Next, based on the space information, controller 120 sets each of spaces 211 to 219 as either one of the first space and the second space (S82). For example, when detecting a conversation by a person from microphones 51 and 58, controller 120 sets spaces 211 and 218 as the first space. In addition, for example, when switch 61 is in an on-state, controller 120 sets space 211 as the first space.

Next, controller 120 controls loudspeakers 31 to 39 so that audio is outputted louder in one or more spaces set as the second space than in one or more spaces set as the first space among the plurality of spaces 211 to 219 (S83). For example, controller 120 outputs audio for masking from loudspeakers 32 to 37 and 39 disposed in spaces 212 to 217 and 219 set as the second space but does not output audio from loudspeakers 31 and 38 disposed in spaces 211 and 218 set as the first space.

Even in this case, controller 120 controls the sound volume of loudspeakers disposed in the one or more spaces set as the second space among loudspeakers 31 to 39 in accordance with the sound volume information in a similar manner to the embodiment.

Accordingly, a sound volume of the audio for masking the sound generated in the first space being used by people is adjusted to be lower with an increase in the loudness of the sound in the second space even when the first space and the second space are dynamically set. Therefore, the sound generated in the first space can be masked in an efficient manner.

While audio control device 100 obtains space information from microphones 51 to 59 and switches 61, 63, 65, 67, and 69 in the third variation, obtaining of space information is not limited thereto. For example, when a human detecting sensor capable of detecting a total number of people such as human detecting sensor 22 is disposed in each of spaces 211 to 219, controller 120 may set a space in which a human detecting sensor having detected a plurality of people is disposed as the first space. In addition, when server 40 accepts a usage reservation of each of spaces 211 to 219, a space scheduled to be used by a plurality of people may be set as the first space.

Fourth Variation

While human detecting sensor 22 disposed in second space 202 is an image-based human detecting sensor capable of detecting a total number of people present in second space 202 and the total number of people is determined by analyzing a two-dimensional image as a detection result in the embodiment described above, human detecting sensors and the determination of a total number of people are not limited thereto. For example, a plurality of human detecting sensors may be disposed so as to correspond to a plurality of regions created by dividing second space 202 and the total number of people present in second space 202 may be detected by detecting the presence of people in each of the plurality of regions. In other words, controller 120 may determine the number of human detecting sensors having detected the presence of a person among the plurality of human detecting sensors as the total number of people present in second space 202.

In addition, the human detecting sensor disposed in second space 202 may be a camera. Controller 120 may perform image recognition processing on a two-dimensional image photographed by the camera to determine people captured in the two-dimensional image. Accordingly, controller 120 may determine the total number of people present in second space 202.

Fifth Variation

While audio control system 1 includes audio control device 100, microphones 11 and 12, human detecting sensors 21 and 22, and loudspeaker 30 in the embodiment described above, audio control system 1 is not limited thereto and may only include audio control device 100 and need not include microphones 11 and 12, human detecting sensors 21 and 22, and loudspeaker 30.

Moreover, in the above embodiment, each constituent element may be configured in the form of dedicated hardware or realized by executing a software program suitable for the constituent element. Each constituent element may be realized by means of a program executing unit, such as a central processing unit (CPU) or a processor, reading and executing a software program recorded on a recording medium such as a hard disk or semiconductor memory.

Furthermore, each constituent element may be a circuit (or an integrated circuit). These circuits may be consolidated as a single circuit and, alternatively, may be individual circuits. In addition, these circuits may be ordinary circuits and, alternatively, may be specialized circuits.

Moreover, the general or specific aspects of the present disclosure may be realized as a system, a device, a method, an integrated circuit, a computer program, or may be realized as a computer-readable non-transitory recording medium such as a CD-ROM. Additionally, the general or specific aspects of the present disclosure may be realized as any combination of a system, a device, a method, an integrated circuit, a computer program, or a computer-readable non-transitory recording medium.

For example, the present disclosure may be realized as an image processing method executed by an image processing device (a computer or a digital signal processor (DSP)), or may be realized as a program for causing a computer or a DSP to execute the above image processing method.

Furthermore, in the above embodiment, a process executed by a certain processing unit may be executed by a different processing unit. In addition, the orders of the processes in the operation of the audio control system described in the above embodiment may be rearranged, or the processes may be performed in parallel.

Forms obtained by various modifications to the embodiment that can be conceived by a person skilled in the art as well as forms realized by arbitrarily combining the constituent elements and the functions in the embodiment are included in the scope of the present disclosure, as long as they do not depart from the essence of the present disclosure.

INDUSTRIAL APPLICABILITY

The present disclosure is useful as an audio control system, an audio control method, a program, and the like capable of efficiently masking sound generated in a space used by people.

The invention claimed is:

1. An audio control system comprising:

an obtainer that obtains sound data indicating a sound picked up by a microphone disposed in a second space located in an area surrounding a first space used by a person;

a storage in which sound source data is stored; and a controller that causes one or more loudspeakers disposed in the first space or the second space to reproduce an audio obtained from the sound source data more loudly in the second space than in the first space, wherein the controller determines a loudness of the sound indicated in the sound data obtained, and adjusts a sound volume of the audio outputted from the one or more loudspeakers to be lower with an increase in the loudness of the sound determined.

2. The audio control system according to claim 1, wherein the obtainer further obtains presence information about presence of a person in the first space, and when the controller determines that a person is not present in the first space based on the presence information, the controller causes the one or more loudspeakers not to output the audio.

3. The audio control system according to claim 2, wherein the presence information includes a second detection result provided by each of one or more human detecting sensors that perform detection for the first space, and when the second detection result indicates that a person is not present in the first space, the controller causes the one or more loudspeakers not to output the audio.

4. The audio control system according to claim 2, wherein the presence information includes an activity schedule of each of one or more people for using the first space, and when the controller determines that use of the first space is not currently scheduled based on the activity schedule of each of the one or more people included in the presence information, the controller causes the one or more loudspeakers not to output the audio.

5. The audio control system according to claim 1, wherein the obtainer obtains sound data indicating a sound picked up by a microphone that picks up a sound in the second space, and the controller stores the sound data as the sound source data into the storage, and generates an audio to be outputted from the one or more loudspeakers, using the sound source data stored in the storage.

6. The audio control system according to claim 5, wherein the obtainer obtains first sound data and second sound data, the first sound data indicating a sound picked up by the microphone during a first time period, the second sound data indicating a sound picked up by the microphone during a second time period, and the controller stores the first sound data and the second sound data as the sound source data into the storage; generates an audio to be outputted from the one or more loudspeakers during the first time period, using the first sound data; and generates an audio to be outputted from the one or more loudspeakers during the second time period, using the second sound data.

7. The audio control system according to claim 1, wherein the obtainer obtains space information for determining the first space from among a plurality of spaces including the first space and the second space, and the controller sets each of the plurality of spaces as one of the first space or the second space based on the space information, and causes the one or more loudspeakers to reproduce the audio more loudly in one or more of the plurality of spaces each set as the second space than in one or more of the plurality of spaces each set as the first space.

8. An audio control system comprising:

an obtainer that obtains headcount information about a total number of people present in a second space located in an area surrounding a first space used by a person;

a storage in which sound source data is stored; and a controller that causes one or more loudspeakers disposed in the first space or the second space to reproduce an audio obtained from the sound source data more loudly in the second space than in the first space, wherein the controller adjusts a sound volume of the audio outputted from the one or more loudspeakers to be lower with an increase in the total number of people based on the headcount information obtained.

9. The audio control system according to claim 8, wherein the headcount information includes a first detection result provided by each of one or more human detecting sensors that perform detection for the second space, and the controller determines a total number of people present in the second space based on the first detection result.

10. The audio control system according to claim 8,
wherein the headcount information includes an activity schedule of each of one or more people for using the second space, and
the controller determines a total number of people currently present in the second space by counting a total number of people currently scheduled to use the second space based on the activity schedule included in the headcount information.

11. An audio control method comprising:
obtaining sound data indicating a sound picked up by a microphone disposed in a second space located in an area surrounding a first space used by a person; and
causing one or more loudspeakers disposed in the first space or the second space to reproduce an audio obtained from the sound source data more loudly in the second space than in the first space,
wherein a loudness of the sound indicated in the sound data obtained is determined, and a sound volume of the audio outputted from the one or more loudspeakers is adjusted to be lower with an increase in the loudness of the sound determined.

12. A non-transitory computer-readable recording medium having recorded thereon a computer program for causing a computer to execute the audio control method according to claim 11.

13. An audio control method comprising:
obtaining headcount information about a total number of people present in a second space located in an area surrounding a first space used by a person;
causing one or more loudspeakers disposed in the first space or the second space to reproduce an audio obtained from the sound source data more loudly in the second space than in the first space,
wherein a sound volume of the audio outputted from the one or more loudspeakers is adjusted to be lower with an increase in the total number of people based on the headcount information obtained.

14. A non-transitory computer-readable recording medium having recorded thereon a computer program for causing a computer to execute the audio control method according to claim 13.

* * * * *